United States Patent
Pain

(10) Patent No.: US 9,638,235 B2
(45) Date of Patent: May 2, 2017

(54) CLEVIS PIN ASSEMBLY

(71) Applicant: David Pain, Aurora, CA (US)

(72) Inventor: David Pain, Aurora, CA (US)

( * ) Notice: Subject to any disclaimer, the term of this patent is extended or adjusted under 35 U.S.C. 154(b) by 37 days.

(21) Appl. No.: 14/796,078

(22) Filed: Jul. 10, 2015

(65) Prior Publication Data

US 2017/0009796 A1    Jan. 12, 2017

(51) Int. Cl.
| | |
|---|---|
| *F16B 21/00* | (2006.01) |
| *F16B 33/00* | (2006.01) |
| *F16B 35/04* | (2006.01) |

(52) U.S. Cl.
CPC ............ *F16B 33/008* (2013.01); *F16B 35/04* (2013.01)

(58) Field of Classification Search
CPC .......... F16B 21/00; F16B 21/12; F16B 21/16; F16B 33/008; F16B 33/06; F16B 35/04; F16B 39/04
USPC ....... 411/82.1, 351, 355–356, 364, 424, 428, 411/513, 517
See application file for complete search history.

(56) References Cited

U.S. PATENT DOCUMENTS

| | | | | | |
|---|---|---|---|---|---|
| 837,767 | A * | 12/1906 | Aims | .................... | E21D 11/385 220/693 |
| 1,433,095 | A * | 10/1922 | Peary | ..................... | E05D 11/02 16/274 |
| 1,985,708 | A | 12/1934 | Zerk | | |
| 2,112,807 | A * | 3/1938 | Cooke | ...................... | B61G 9/24 411/351 |
| 2,266,689 | A * | 12/1941 | Lemison | ................. | F16B 21/12 411/514 |
| 2,518,468 | A * | 8/1950 | Harding | .................. | F16B 33/06 411/269 |
| 2,923,359 | A * | 2/1960 | Duffield | .................... | F16B 7/00 403/146 |
| 3,240,379 | A * | 3/1966 | Bremer | ................... | F16L 41/08 220/359.1 |
| 3,407,903 | A * | 10/1968 | Sansabrino | ............. | F16B 33/00 16/274 |
| 4,063,582 | A * | 12/1977 | Fischer | ................. | F16B 13/141 156/293 |
| 4,512,123 | A * | 4/1985 | Fischer | ............... | E04G 23/0203 405/269 |
| 4,832,360 | A | 5/1989 | Christian | | |
| 5,033,952 | A * | 7/1991 | Haug | ...................... | F16B 13/00 405/259.5 |
| D322,261 | S | 12/1991 | Porter | | |
| 5,599,150 | A * | 2/1997 | Edwards | ................. | F16B 21/12 411/351 |
| 5,771,538 | A * | 6/1998 | Huppert, Sr. | ........... | E05D 11/02 16/274 |
| 6,588,999 | B2 * | 7/2003 | Kubler | .................. | F16B 33/004 411/258 |
| 6,634,843 | B1 * | 10/2003 | Tarnow | ................... | F16B 21/12 403/155 |

(Continued)

*Primary Examiner* — Roberta Delisle

(57) ABSTRACT

A clevis pin assembly includes a pin that may be removably inserted into a coupling. The pin is structured to have a channel extending therethrough. The channel may receive a lubricant thereby inhibiting the pin from becoming seized within the coupling. A fitting is removably coupled to the pin. The fitting may be fluidly coupled to a lubrication source thereby facilitating the lubricant to be introduced into the channel. A retainer is removably inserted through the pin thereby retain the pin within the coupling.

9 Claims, 3 Drawing Sheets

(56) References Cited

U.S. PATENT DOCUMENTS

| | | | | |
|---|---|---|---|---|
| 7,143,988 B2 * | 12/2006 | Blateri | ............... | F21V 21/12 |
| | | | | 248/343 |
| 7,993,087 B2 | 8/2011 | Hsieh | | |
| 8,556,558 B1 * | 10/2013 | Hunt | ............... | F16B 39/021 |
| | | | | 411/395 |
| 2004/0109738 A1 * | 6/2004 | Ducker, III | ......... | F16B 33/004 |
| | | | | 411/82.1 |
| 2013/0206512 A1 | 8/2013 | Webb et al. | | |

* cited by examiner

CLEVIS PIN ASSEMBLY

BACKGROUND OF THE DISCLOSURE

Field of the Disclosure

The disclosure relates to pin devices and more particularly pertains to a new pin device that may have a lubricant introduced therein.

SUMMARY OF THE DISCLOSURE

An embodiment of the disclosure meets the needs presented above by generally comprising a pin that may be removably inserted into a coupling. The pin is structured to have a channel extending therethrough. The channel may receive a lubricant thereby inhibiting the pin from becoming seized within the coupling. A fitting is removably coupled to the pin. The fitting may be fluidly coupled to a lubrication source thereby facilitating the lubricant to be introduced into the channel. A retainer is removably inserted through the pin thereby retain the pin within the coupling.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
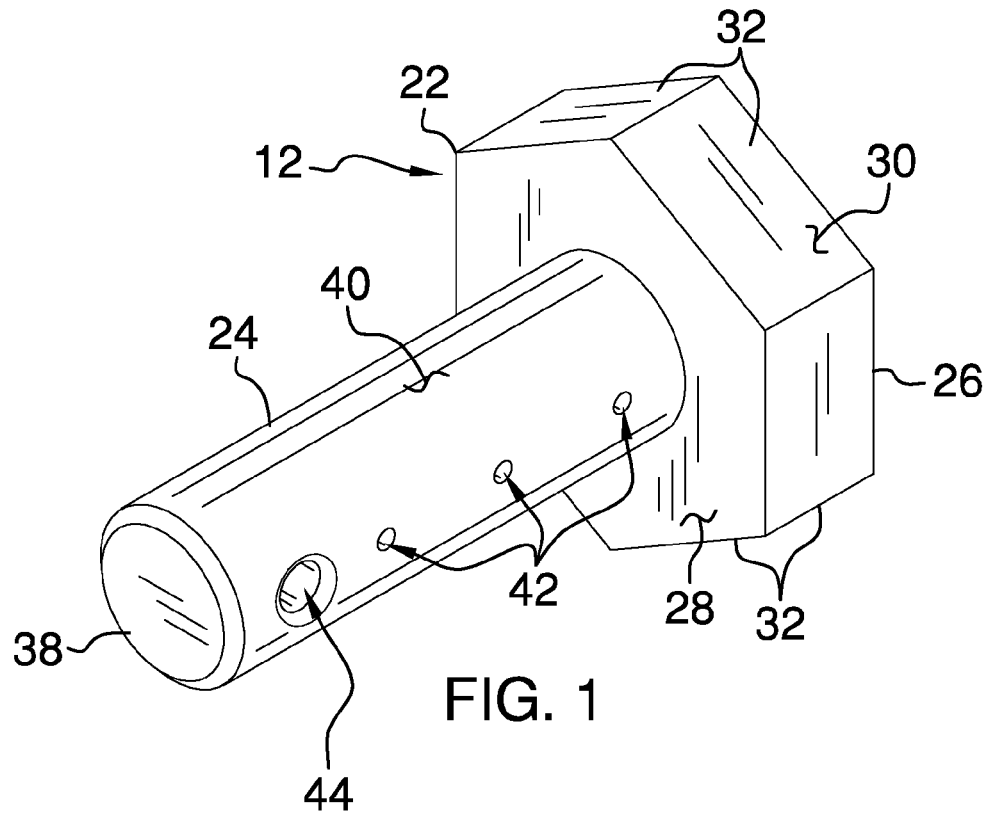
FIG. 1 is a perspective view of a clevis pin assembly according to an embodiment of the disclosure.
Figure 2:
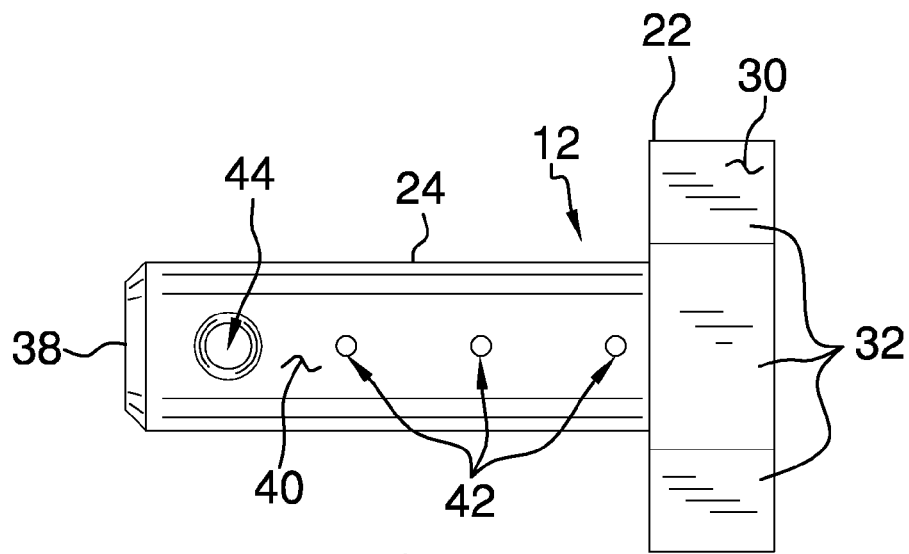
FIG. 2 is a right side view of an embodiment of the disclosure.
Figure 3:
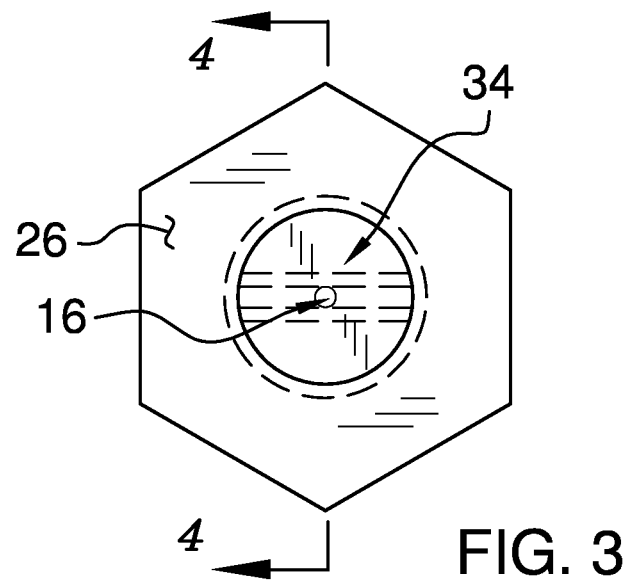
FIG. 3 is a front view of an embodiment of the disclosure.
Figure 4:
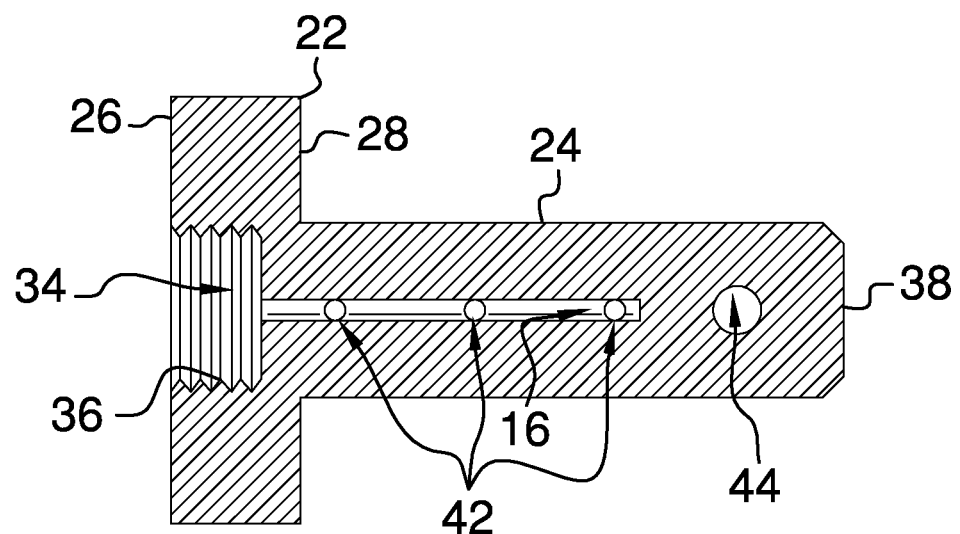
FIG. 4 is a cross sectional view taken along line 4-4 of FIG. 3 of an embodiment of the disclosure.
Figure 5:
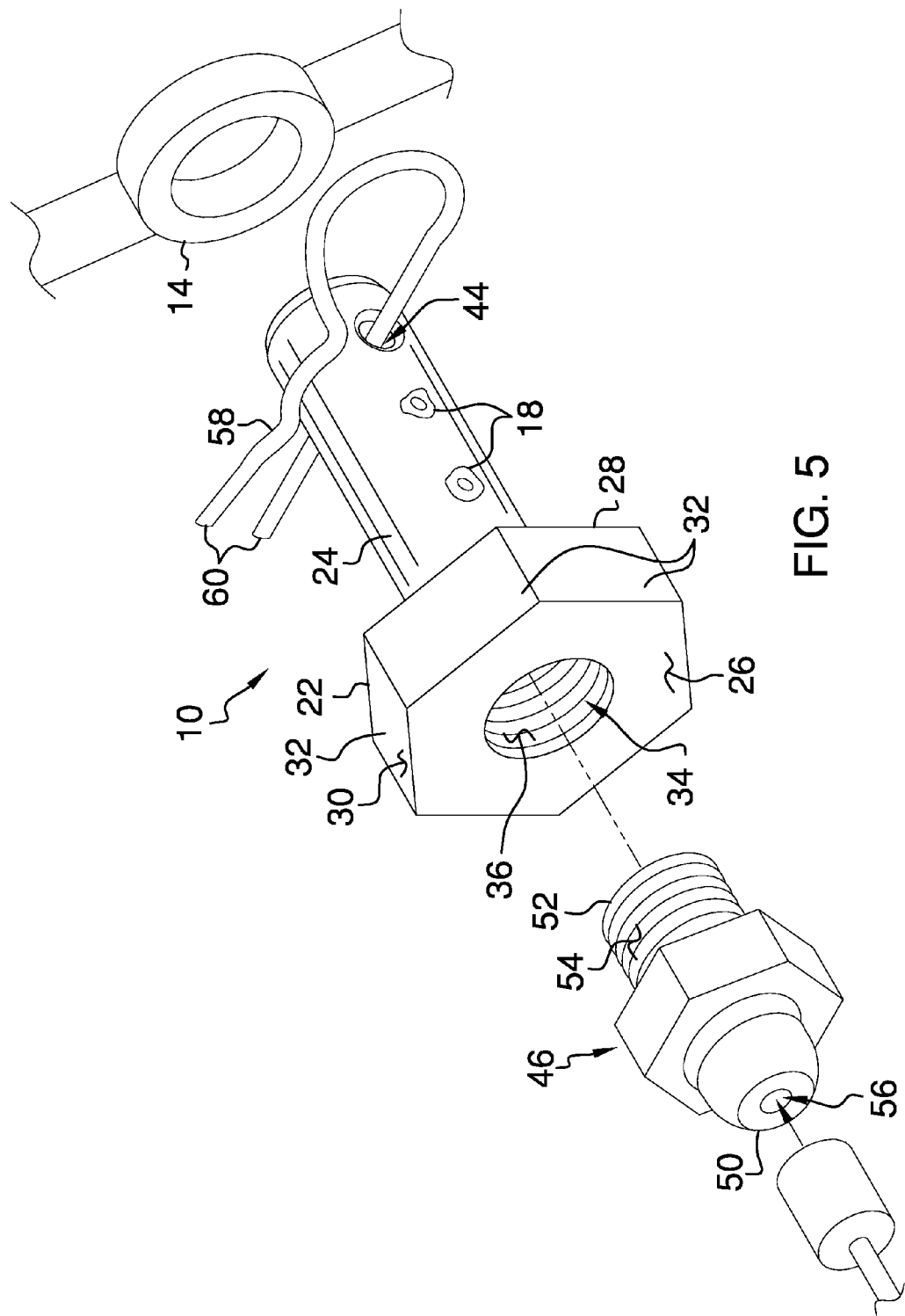
FIG. 5 is a perspective in-use view of an embodiment of the disclosure.

With reference now to the drawings, and in particular to FIGS. 1 through 5 thereof, a new pin device embodying the principles and concepts of an embodiment of the disclosure and generally designated by the reference numeral 10 will be described.

As best illustrated in FIGS. 1 through 5, the clevis pin assembly 10 generally comprises a pin 12 that may be removably inserted into a coupling 14. The pin 12 is structured to have a channel 16 extending therethrough. The channel 16 may receive a lubricant 18 thereby inhibiting the pin 12 from becoming seized within the coupling 14. The coupling 14 may be a clevis or the like that is utilized on but not limited to air brake systems or the like.

The pin 12 has a head 22 and a shaft 24. The head 22 has a first surface 26, a second surface 28 and a peripheral surface 30 extending between the first surface 26 and the second surface 28. The peripheral surface 30 has a plurality of intersecting faces 32 such that the head 22 has a hexagonal shape. Thus, the head 22 may be manipulated with a wrench thereby facilitating the pin 12 to be removed from the coupling 14. The first surface 26 has a well 34 extending inwardly toward the second surface 28. The well 34 has a bounding surface 36 and the bounding surface 36 is threaded.

The shaft 24 extends away from the second surface 28 and the shaft 24 has a distal end 38 with respect to the second surface 28. The shaft 24 has an exterior surface 40 extending between the head 22 and the distal end 38. The exterior surface 40 is curved such that the shaft 24 has a cylindrical shape. The shaft 24 may be inserted into the coupling 14 having the exterior surface 40 frictionally engaging the coupling 14.

The channel 16 extends longitudinally through the shaft 24 toward the distal end 38. The channel 16 intersects the well 34 and the exterior surface 40 has a plurality of openings 42 extending into the channel 16. The openings 42 are spaced apart from each other and the openings 42 are distributed along the shaft 24. The exterior surface 40 has an aperture 44 extending therethrough and the aperture 44 is positioned between the distal end 38 and the channel 16. The aperture 44 extends completely through the shaft 24.

A fitting 46 is provided and the fitting 46 is removably coupled to the pin 12. The fitting 46 may be fluidly coupled to a lubrication source 48 thereby facilitating the lubricant 18 to be introduced into the channel 14. The lubrication source 48 may be a grease gun or the like and the lubricant 18 may be grease. The fitting 46 has a first end 50, a second end 52 and an exterior surface 54 extending between the first end 50 and the second end 52. The exterior surface 54 is threaded adjacent to the second end 52 and the exterior surface 54 threadably engages the bounding surface 36 of the well 34.

The fitting 46 has a tunnel 56 that extends through the first end 50 and the second end 52. Thus, the tunnel 56 is in fluid communication with the well 34 when the fitting 46 is coupled to the pin 12. The first end 50 may be coupled to the lubrication source 48 thereby facilitating the lubricant 18 to be urged into the channel 16 and outwardly through each of the openings 42. The lubricant 18 inhibits the pin 12 from becoming seized within the coupling 14 and the fitting 18 may comprise a grease zerk or the like.

A retainer 58 is removably inserted through the pin 12 such that the retainer 58 may retain the pin 12 within the coupling 14. The retainer 58 has a pair of ends 60 and the retainer 58 is curved between the pair of ends 60 such that retainer 58 has a U-shape. One of the ends 60 of the retainer 58 is directed through the aperture 44 such that the retainer 58 extends through the shaft 24. The retainer 58 may comprise a cotter pin or the like.

In use, the pin 12 is inserted into the coupling 14 and the retainer 58 is extended through the aperture 44 in the shaft 24. The lubrication source 48 is fluidly coupled to the first end 50 of the fitting 46 and the lubricant 18 is urged into the channel 16. The lubricant 18 exits each of the openings 42 to lubricate the pin 12 within the coupling 14. Thus, the pin 12 is inhibited from becoming seized in the coupling 14 thereby facilitating the pin 12 to be removed from the coupling 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A clevis pin assembly configured to internally receive a lubricant, said assembly comprising:
    a pin being configured to be removably inserted into a coupling, said pin being structured to have a channel extending therethrough, said channel being configured to receive a lubricant thereby inhibiting said pin from becoming seized within the coupling;
    a fitting being removably coupled to said pin, said fitting being configured to be fluidly coupled to a lubrication source thereby facilitating the lubricant to be introduced into said channel; and
    a retainer being removably inserted through said pin wherein said retainer is configured to retain said pin within the coupling; and
    wherein said pin has a head and a shaft, said head having a first surface, a second surface and a peripheral surface extending between said first surface and said second surface, said peripheral surface having a plurality of intersecting faces such that said head has a hexagonal shape wherein said head is configured to be manipulated with a wrench thereby facilitating said pin to be removed from the coupling.

2. The assembly according to claim 1, wherein said first surface has a well extending inwardly toward said second surface, said well having a bounding surface, said bounding surface being threaded.

3. The assembly according to claim 1, wherein:
    said exterior surface has a plurality of openings extending into said channel, said openings being spaced apart from each other and being distributed along said shaft; and
    said exterior surface has an aperture extending therethrough, said aperture being positioned between said distal end and said channel, said aperture extending completely through said shaft.

4. A clevis pin assembly configured to internally receive a lubricant, said assembly comprising:
    a pin being configured to be removably inserted into a coupling, said pin being structured to have a channel extending therethrough, said channel being configured to receive a lubricant thereby inhibiting said pin from becoming seized within the coupling;
    a fitting being removably coupled to said pin, said fitting being configured to be fluidly coupled to a lubrication source thereby facilitating the lubricant to be introduced into said channel;
    a retainer being removably inserted through said pin wherein said retainer is configured to retain said pin within the coupling; and
    wherein said pin has a head and a shaft, said head having a second surface; and said shaft extends away from said second surface, said shaft having a distal end with respect to said second surface, said shaft having an exterior surface extending between said head and said distal end, said exterior surface being curved such that said shaft has a cylindrical shape, said shaft being configured to be inserted into the coupling having said exterior surface frictionally engaging the coupling.

5. The assembly according to claim 4, wherein:
    said head has a well; and
    said channel extends longitudinally through said shaft toward said distal end, said channel intersecting said well.

6. A clevis pin assembly configured to internally receive a lubricant, said assembly comprising:
    a pin being configured to be removably inserted into a coupling, said pin being structured to have a channel extending therethrough, said channel being configured to receive a lubricant thereby inhibiting said pin from becoming seized within the coupling;
    a fitting being removably coupled to said pin, said fitting being configured to be fluidly coupled to a lubrication source thereby facilitating the lubricant to be introduced into said channel;
    a retainer being removably inserted through said pin wherein said retainer is configured to retain said pin within the coupling;
    wherein said head has a well, said well having a bounding surface; and said fitting has a first end, a second end and an exterior surface extending between said first end and said second end, said exterior surface being threaded adjacent to said second end, said exterior surface threadably engaging said bounding surface.

7. The assembly according to claim 6, wherein said fitting has a tunnel extending through said first end and said second end such that said tunnel is in fluid communication with said well when said fitting is coupled to said pin, said first end being configured to be coupled to the lubrication source thereby facilitating the lubricant to be urged into said channel and outwardly through each of said openings such that said pin is prevented from becoming seized within the coupling.

8. A clevis pin assembly configured to internally receive a lubricant, said assembly comprising:
    a pin being configured to be removably inserted into a coupling, said pin being structured to have a channel extending therethrough, said channel being configured to receive a lubricant thereby inhibiting said pin from becoming seized within the coupling;
    a fitting being removably coupled to said pin, said fitting being configured to be fluidly coupled to a lubrication source thereby facilitating the lubricant to be introduced into said channel;
    a retainer being removably inserted through said pin wherein said retainer is configured to retain said pin within the coupling; and
    wherein said retainer has a pair of ends, said retainer being curved between said pair of ends such that retainer has a U-shape, one of said ends of said retainer being directed through said aperture such that said retainer extends through said shaft.

9. A clevis pin assembly configured to internally receive a lubricant, said assembly comprising:

a pin being configured to be removably inserted into a coupling, said pin being structured to have a channel extending therethrough, said channel being configured to receive a lubricant thereby inhibiting said pin from becoming seized within the coupling, said pin having a head and a shaft, said head having a first surface, a second surface and a peripheral surface extending between said first surface and said second surface, said peripheral surface having a plurality of intersecting faces such that said head has a hexagonal shape wherein said head is configured to be manipulated with a wrench thereby facilitating said pin to be removed from the coupling, said first surface having a well extending inwardly toward said second surface, said well having a bounding surface, said bounding surface being threaded, said shaft extending away from said second surface, said shaft having a distal end with respect to said second surface, said shaft having an exterior surface extending between said head and said distal end, said exterior surface being curved such that said shaft has a cylindrical shape, said shaft being configured to be inserted into the coupling having said exterior surface frictionally engaging the coupling, said channel extending longitudinally through said shaft toward said distal end, said channel intersecting said well, said exterior surface having a plurality of openings extending into said channel, said openings being spaced apart from each other and being distributed along said shaft, said exterior surface having an aperture extending therethrough, said aperture being positioned between said distal end and said channel, said aperture extending completely through said shaft;

a fitting being removably coupled to said pin, said fitting being configured to be fluidly coupled to a lubrication source thereby facilitating the lubricant to be introduced into said channel, said fitting having a first end, a second end and an exterior surface extending between said first end and said second end, said exterior surface being threaded adjacent to said second end, said exterior surface threadably engaging said bounding surface, said fitting having a tunnel extending through said first end and said second end such that said tunnel is in fluid communication with said well when said fitting is coupled to said pin, said first end being configured to be coupled to the lubrication source thereby facilitating the lubricant to be urged into said channel and outwardly through each of said openings such that said pin is prevented from becoming seized within the coupling; and a retainer being removably inserted through said pin wherein said retainer is configured to retain said pin within the coupling, said retainer having a pair of ends, said retainer being curved between said pair of ends such that retainer has a U-shape, one of said ends of said retainer being directed through said aperture such that said retainer extends through said shaft.

* * * * *